United States Patent [19]

Kupfer et al.

[11] Patent Number: 5,039,450
[45] Date of Patent: Aug. 13, 1991

[54] PROCESS FOR THE SEPARATION OF CRUDE OIL EMULSIONS OF THE WATER-IN-OIL TYPE

[75] Inventors: Rainer Kupfer, Kastl; Willibald Böse, Burgkirchen; Martin Hille, Liederbach; Roland Böhm, Kelkheim; Friedrich Staiss, Wiesbaden, all of Fed. Rep. of Germany

[73] Assignee: Hoechst Aktiengesellschaft, Frankfurt am Main, Fed. Rep. of Germany

[21] Appl. No.: 324,189

[22] Filed: Mar. 16, 1989

[30] Foreign Application Priority Data

Mar. 18, 1988 [DE] Fed. Rep. of Germany ....... 3809067

[51] Int. Cl.$^5$ ................... B01D 17/04; C08F 283/10; C08L 61/14
[52] U.S. Cl. .................... 252/331; 252/358; 210/708; 525/507; 568/609
[58] Field of Search ......... 252/328, 331, 358; 210/708; 208/188; 525/507; 528/154; 568/609, 611

[56] References Cited

U.S. PATENT DOCUMENTS

| | | | |
|---|---|---|---|
| 2,557,081 | 11/1949 | De Groote et al. | 252/331 |
| 2,594,541 | 12/1949 | De Groote et al. | 252/331 |
| 2,723,250 | 11/1955 | De Groote et al. | 252/331 X |
| 3,544,655 | 12/1970 | Booth et al. | 525/507 X |
| 4,054,554 | 10/1977 | Buriks et al. | 525/507 |
| 4,060,501 | 11/1977 | Naylor et al. | 252/358 X |
| 4,117,031 | 9/1978 | Macenka et al. | 252/331 X |
| 4,209,422 | 6/1980 | Zimmerman et al. | 252/358 X |
| 4,321,147 | 3/1982 | McCoy et al. | 252/331 X |
| 4,419,265 | 12/1983 | Diery et al. | 252/331 |
| 4,420,413 | 12/1983 | Diery et al. | 252/331 |
| 4,431,565 | 2/1984 | Billenstein et al. | 252/331 |
| 4,465,817 | 8/1984 | Billenstein et al. | 252/331 X |

FOREIGN PATENT DOCUMENTS

1153356  9/1983  Canada .................................. 252/75

*Primary Examiner*—Richard D. Lovering
*Assistant Examiner*—Daniel S. Metzmaier

[57] ABSTRACT

A process for the separation of crude oil emulsions of the water-in-oil type

In the novel process addition products made from certain ethylene oxide/propylene oxide block polymers and certain polyglycidyl ethers of phenol/formaldehyde condensation products are added to the crude oil emulsions.

4 Claims, No Drawings

PROCESS FOR THE SEPARATION OF CRUDE OIL EMULSIONS OF THE WATER-IN-OIL TYPE

DESCRIPTION

The invention relates to a process for the separation of crude oil emulsions of the water-in-oil type by addition of glycidyl ether compounds.

The two U.S. Pat. Nos. 4,419,265 and 4,420,413 have disclosed that crude oil splitters from the group of glycidyl ether compounds are used in order to separate crude oil emulsions of the water-in-oil type. The crude oil splitters of U.S. Pat. No. 4,419,265 are produced by addition of 1 mol of an ethylene oxide/propylene oxide block polymer to 0.6 to 1 mol of a diglycidyl ether of bisphenols and that of U.S. Pat. No. 4,420,413 by following the addition step mentioned with an oxalkylation using ethylene oxide, propylene oxide and/or butylene oxide.

Glycidyl ether compounds are already known, which are addition products made from ethylene oxide/propylene oxide block polymers and polyglycidyl ethers of phenol/formaldehyde condensation products (novolak resins), in which the ratio of the hydroxyl equivalents in the polyether block polymer to the epoxide equivalents in the condensation product is 2:1 to 5:1. Glycidyl ether compounds of this type are described in CA patent 1,153,356 as thickening agents for hydraulic fluids based on glycol-water. Further applications mentioned are the use in brake fluids and lubricants and as the starting material for surfactants, plasticizers and resins. The possibility of use as an emulsion splitter, particularly as a splitter of crude oil emulsions of the water-in-oil type is neither mentioned nor indicated.

It is well known that in the production of crude oil, increasingly dilution of the oil with water is occurring. The associated water which is produced forms a water-in-oil emulsion with the oil. Salts such as sodium chloride, calcium chloride and magnesium chloride may be dissolved in the emulsified water. This water of emulsion must be separated before transportation. The salt content is further reduced by formation of a new emulsion with fresh water and demulsification in the refineries before distillation. If the salt content in the crude oil is too high, this can lead to malfunctions and corrosion in the refineries. A crude oil splitter, also called a demulsifier or emulsion splitter, has the purpose, when used at the lowest possible concentration, of breaking the emulsion and in this separation process, as far as possible without or with minimal additional use of heat, to cause a complete separation of water and to reduce the salt content to a minimum. The quality criteria for delivered crude oil are the residual salt content and the water content. Crude oils have different compositions according to their source. Natural emulsion stabilizers have a complex, multifarious chemical structure. In order to overcome their effect, splitters must be developed selectively. The requirements which are placed on a crude oil splitter are made more varied by different production and processing conditions. Since new oil fields are continually being developed and the production conditions of old oil fields are altered, the developement of optimal demulsifiers remains an acute problem, and a large number of differently constituted demulsifiers and demulsifier mixtures are needed.

It has been found that certain addition products made from ethylene oxide/propylene oxide block polymers and polyglycidyl ethers of phenol/formaldehyde condensation products have highly effective properties with regard to water-in-oil emulsions.

The process according to the invention for the separation of crude oil emulsions of the water-in-oil type by addition of glycidyl ether compounds accordingly comprises adding an effective quantity of addition products made from 1 equivalent of an ethylene oxide/propylene oxide block polymer of the following formula I

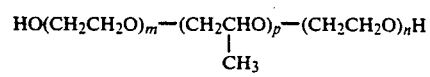

in which m and n are numbers, which are selected in such a way that the proportion of polyethylene oxide is 10 to 80% of the molecular weight of the total molecule, and p is a number from 10 to 100, and 0.1 to 1.5 equivalent, preferably 0.3 to 1 equivalent, of a polyglycidyl ether of the following formula II

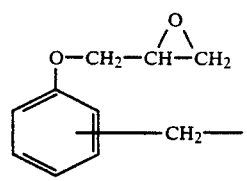

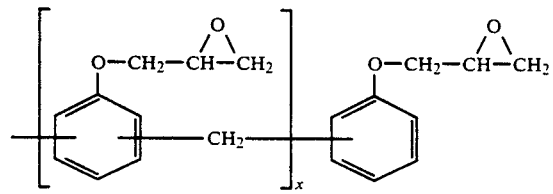

in which x is a number from 1 to 10, to the crude oil emulsions.

Preferred ethylene oxide/propylene oxide block polymers of the formula I are those, in which n and m are numbers, which are selected so that the proportion of polyethylene oxide is 15 to 70% of the molecular weight of the total molecule, and p is a number from 20 to 70. Preferred polyglycidyl ethers of the formula II are those, in which x is a number from 2 to 5 (it is well known that the —CH$_2$— bridges in the formula II are located essentially in the ortho- and para-position on the phenyl nucleus). Polyether block polymers of the formula I and glycidyl ethers of the formula II as well as the conversion of these compounds to addition products are described in the publications initially mentioned.

Within the scope of the present invention, the polyether block polymers of the formula I and the polyglycidyl ethers of the formula II are used in the preparation of the relevant addition products, in such a way that the ratio of hydroxyl equivalents in the polyether block polymer to the epoxide equivalents in the polyglycidyl ether is 1:0.1 to 1.5, preferably 1:0.3 to 1. Even though the addition reaction as such is known from the initially mentioned publications, a preferred method for the preparation of the addition products which are to be used according to the invention is given here. The addition reaction can be carried out using an inert solvent, such as toluene or xylene, or without solvent in the melt and under a blanket of protective gas, operation in the melt being preferred. The reaction temperature is 70° to 150° C., preferably 80° to 120° C. It may be expedient to add the total amount of polyglycidyl ether in two to three parts during the course of the reaction. The addition is preferably carried out in the presence of a catalyst, which may be of the alkaline or acid type. Preferred alkaline catalysts are alkali metal hydroxides, alkali metal carbonates, alkali metal lactates and alkali metal alcoholates, such as sodium methylate, potassium methylate and the like. Preferred acid catalysts are Lewis acids, such as $BF_3$ etherates, hydrohalic acids, sulfuric acid and sulfonic acids. The catalyst is used in a quantity of 0.05 to 3% by weight, preferably in a quantity of 0.1 to 1% by weight, percentages by weight being based on the weight of the polyether block polymer used. The conversion is carried out long enough for the addition product to reach the desired epoxide number of <1 to 2. The addition product obtained may be freed from the catalyst used by washing with water. The reaction time is in the range of 1 to 10 hours. The relevant addition products occur as yellow to brown colored liquids of a greater or lesser viscosity and have the epoxide number mentioned.

It has been shown that the crude oil splitting effectiveness of the selected addition products according to the invention is further increased, if the addition described is followed by a propoxylation, thus when propoxylated addition products of the type described are used. According to the invention, propoxylation is carried out with 5 to 700 g propylene oxide, preferably 30 to 300 g propylene oxide, per 100 g addition product. Although the relevant propoxylation as such is known from the publications initially mentioned, a preferred method is given here. The relevant propoxylation may be carried out using an inert solvent, with toluene or xylene, or without solvent in the melt and under a blanket of protective gas, operation in the melt being preferred. An alkaline catalyst is used in a quantity of 0.05 to 3% by weight, preferably 0.1 to 2% by weight, percentages by weight being based on the weight of the addition product to be propoxylated. Here, suitable alkaline catalysts are also the ones mentioned above. The mixture of addition product and catalyst is heated to a temperature of 80° to 150° C., preferably 100° to 130° C., in a reaction vessel and pressurized with the amount of propylene oxide required for propoxylation, when the addition reaction proceeds. The pressure during propoxylation is about 50 to 600 kPa. The end of the conversion is detectable from the reduced pressure. The propoxylated addition product occurs, like the unpropoxylated addition product, as a yellow to brown colored liquid of a greater or lesser viscosity having an epoxide number of <1 to 2.

The process according to the invention has a number of advantages. Thus, at the usual crude oil processing temperatures, even after a short separating time, a complete separation of water and reduction of the salt content is achieved. Thus, with the novel process, at the usual processing temperatures, crude oils to delivery specification are obtained after a short separating time. Also achieved, is that the separated water is practically free from oil, a complete removal of oil from the separated water and thus good water quality being obtained. In the novel process a sharp separation between the oil phase and the water phase occurs, which is a further advantage. The effective quantity of crude oil splitter according to the invention which is to be used may vary within wide limits. In particular, it is dependent on the type of crude oil and on the processing temperature. In general the effective quantity is 5 to 100 g per tonne, preferably 10 to 50 g per tonne. For the purposes of better metering and dispersibility the crude oil splitter according to the invention which is to be used is preferably used in solution. Water or organic liquids are suitable as solvents, for example alcohols such as methanol, isopropanol or butanol, aromatic hydrocarbons such as toluene or xylene, and commercially available mixtures of higher aromatics.

The invention will now be described in more detail using examples:

EXAMPLE 1

In a reaction vessel, fitted with stirrer, reflux condenser, dropping funnel and thermometer, were placed 533.6 g, which is 0.40 equivalent or 0.40 mol hydroxyl function, of an ethylene oxide/propylene oxide block polymer of the given formula I having $m+n=22$ and $p=29$ and having a proportion of polyethylene oxide of 36.3%, based on the molecular weight of the total molecule, which is 2,668. To the block polymer was added an aqueous solution of potassium hydroxide of about 30% by weight, so that 0.3% by weight potassium hydroxide were present as catalyst, percentages by weight based on the quantity of block polymers. The contents of the reaction vessel were heated to 80° C. with stirring, when at this temperature and also with stirring, 64.8 g, which is 0.36 equivalent or 0.36 mol epoxide function, of a polyglycidyl ether of the given formula II having $x=3.3$ (weight of an equivalent of the total molecule=180), were added dropwise in the form of an 80% by weight solution in methyl ethyl ketone over one hour. After the addition the mixture was heated to 100° to 110° C. and maintained at this temperature with stirring. The addition reaction between the block polymer and polyepoxide was monitored by determining the epoxide number. After 6 hours an epoxide number of 1.1 was reached. The addition product obtained, a light yellow colored liquid, had a viscosity of 3.6 Pa . s (at 25° C.) and a cloud temperature of 82° C., measured in accordance with DIN 53 971 using a 50% by weight solution of butyl diglycol in water as the solvent.

EXAMPLE 2

Operation was as in Example 1.

4,804.0 g, which is 1.10 equivalent or 1.10 mol hydroxyl function, of an ethylene oxide/propylene oxide block polymer of the given formula I having $m+n=119$ and $p=60$ and having a proportion of polyethylene oxide of 60%, based on the molecular weight of the total molecule, which is 8,734 (as in Example 1, 0.3% by weight of alkaline catalyst was added to the polyether block polymer) and 81.0 g, which is 0.45 equivalent or 0.45 mol epoxide function, of a polyglycidyl ether of the given formula II having $x=3.3$ (weight of an equivalent of the total molecule=180), in the form of an 80% by weight solution in methyl ethyl ketone were used. The addition product obtained, a light yellow colored wax-like solid, had the epoxide number 1.3 and a cloud temperature of 77° C., measured in accordance with DIN 53 791 using a 25% by weight solution of butyl diglycol in water as the solvent.

EXAMPLE 3

The addition product from Example 1 was propoxylated. In an autoclave with a stirrer were placed 200.0 g addition product and 4.0 g of a 20% by weight solution of potassium methylate in methanol, which is 0.4% by weight potassium methylate, based on the 200.0 g.

The mixture was heated to 80° C. and maintained at this temperature under waterjet vacuum, until it was freed from methanol and dry. The dried mixture was heated to 110° C., when, at 110° to 120° C., 100 g propylene oxide were added in stages (the pressure in the reaction vessel was about 200 kPa). After the polypropylene oxide had reacted the desired propoxylated addition product was present, a light yellow colored liquid having a viscosity of 4.2 Pa . s and a cloud temperature of 67° C., measured as in Example 1.

EXAMPLE 4

The addition product from Example 2 was propoxylated. In an autoclave with a stirrer were placed 200.0 g addition product and 2.0 g of a 40% by weight aqueous solution of sodium hydroxide, which is 0.4% by weight sodium hydroxide, based on the 200.0 g. The mixture was dried as in Example 3 and converted at 110° to 120° C. with 500 g propylene oxide. After all the propylene oxide had reacted, the desired propoxylated addition product was present, a light yellow colored paste having a cloud temperature of 53° C., measured as in Example 2.

The products from Examples 1 to 4 were tested in crude oil emulsions. The results are summarized in the following Tables I and II.

TABLE I

| Origin of the crude oil emulsion: | Emsland, Federal Republic of Germany | | | | | | |
|---|---|---|---|---|---|---|---|
| Water content of the crude oil emulsion: | 63.5% | | | | | | |
| Salt content of the crude oil emulsion: | 10.44% | | | | | | |
| Demulsification temperature: | 45° C. | | | | | | |
| Metered quantity: | 25 ppm | | | | | | |
| Addition product from Example | Water separation in % by volume after hours | | | | | | Residual salt content in ppm in the oil phase |
| | 1 | 3 | 6 | 9 | 12 | 18 | 24 | |
| 1 | 63 | 72 | 80 | 89 | 97 | 99 | 100 | 265 |
| 2 | 54 | 66 | 78 | 91 | 96 | 98 | 99 | 345 |
| 3 | 30 | 42 | 56 | 86 | 99 | 100 | 100 | 125 |
| 4 | 27 | 48 | 77 | 88 | 98 | 99 | 100 | 188 |
| Control | 0 | 0 | 0 | 0 | 0 | 0 | 0 | 54 628 |

TABLE II

| Origin of the crude oil emulsion: | Venezuela |
| --- | --- |
| Water content of the crude oil emulsion: | 36.2% |
| Demulsification temperature: | 80° C. |
| Metered quantity: | 38 ppm |

| Addition product from Example | Water separation in % by volume after minutes | | | | | | Residual water in % by weight in the oil phase |
|---|---|---|---|---|---|---|---|
| | 10 | 20 | 30 | 40 | 50 | 60 | |
| 1 | 63 | 73 | 81 | 90 | 98 | 100 | 0.28 |
| 2 | 59 | 60 | 71 | 84 | 93 | 100 | 0.18 |
| 3 | 48 | 70 | 88 | 100 | 100 | 100 | 0.11 |
| 4 | 89 | 95 | 97 | 99 | 100 | 100 | 0.12 |
| Control | 0 | 0 | 0 | 0 | 0 | 0 | 10.76 |

We claim:

1. A process for the separation of crude oil emulsions of the water-in-oil type by addition of glycidyl ether compounds, which comprise adding an effective quantity of addition products made from the components comprising an ethylene oxide/propylene oxide block polymer of the following formula I

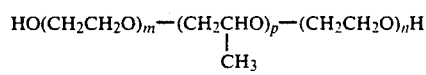

in which m and n are numbers, which are selected in such a way that the proportion of polyethylene oxide is 15 to 70% of the molecular weight of the total molecule, and p is a number from 20 to 70, and 0.1 to 1.5 equivalent, per equivalent of said ethylene oxide/propylene oxide block polymer, of a polyglycidyl ether of the following formula II

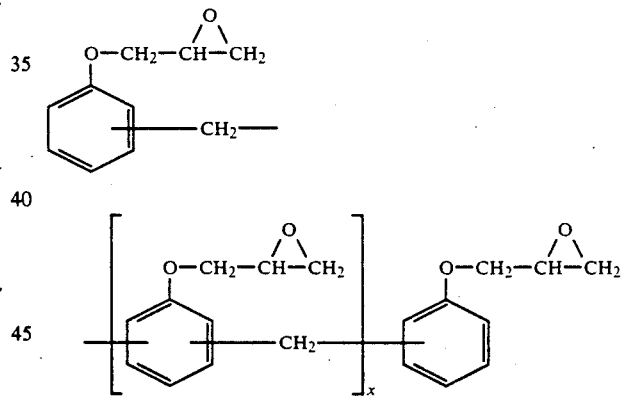

in which x is a number from 2 to 5, to the crude oil emulsions.

2. The process as claimed in claim 1, wherein addition products made from 1 equivalent of an ethylene oxide/propylene oxide block polymer of the formula I and 0.3 to 1 equivalent of a polyglycidyl ether of the formula II are used.

3. The process as claimed in claim 1, wherein the addition product was propoxylated with 5 to 700 g propylene oxide per 100 g addition product.

4. The process as claimed in claim 1, wherein 5 to 100 g addition product or propoxylated addition product per 1,000 kg crude oil emulsion are added to the crude oil emulsion.

* * * * *